United States Patent
Thibault

(10) Patent No.: US 10,309,361 B2
(45) Date of Patent: Jun. 4, 2019

(54) FUEL INJECTOR

(71) Applicant: DELPHI TECHNOLOGIES IP LIMITED, St. Michael (BB)

(72) Inventor: Thierry Thibault, Saint-Ouen-les-Vignes (FR)

(73) Assignee: DELPHI TECHNOLOGIES IP LIMITED (BB)

( * ) Notice: Subject to any disclaimer, the term of this patent is extended or adjusted under 35 U.S.C. 154(b) by 118 days.

(21) Appl. No.: 15/324,344

(22) PCT Filed: Jun. 5, 2015

(86) PCT No.: PCT/EP2015/062571
§ 371 (c)(1),
(2) Date: Jan. 6, 2017

(87) PCT Pub. No.: WO2016/005119
PCT Pub. Date: Jan. 14, 2016

(65) Prior Publication Data
US 2017/0184066 A1    Jun. 29, 2017

(30) Foreign Application Priority Data
Jul. 7, 2014   (FR) ..................................... 14 56541

(51) Int. Cl.
*F02M 63/00*   (2006.01)
*F16K 31/06*   (2006.01)
(Continued)

(52) U.S. Cl.
CPC ...... *F02M 63/0029* (2013.01); *F02M 47/027* (2013.01); *F02M 63/0007* (2013.01);
(Continued)

(58) Field of Classification Search
CPC ........... F02M 51/0621; F02M 51/0625; F02M 51/0635; F02M 51/0639; F02M 51/0642;
(Continued)

(56) References Cited

U.S. PATENT DOCUMENTS 3,247,833 A * 4/1966 Beddoes ............ F02M 51/0625
                                                         123/470
5,188,336 A * 2/1993 Graner ............... F02M 51/0614
                                                         239/585.3
(Continued)

FOREIGN PATENT DOCUMENTS

DE   102007001365 A1   7/2008
DE   102011089198 A1   6/2013
EP       2067980 A1    6/2009

*Primary Examiner* — Hung Q Nguyen
*Assistant Examiner* — Mark L. Greene
(74) *Attorney, Agent, or Firm* — Joshua M. Haines

(57) ABSTRACT

A control valve for controlling the movement of a needle of a fuel injector includes a coil which is attached to a housing of the injector, which housing engages with an armature which can be moved between an open position and a closed position. The armature includes a magnetic plate, through the center of which a rod, which forms a valve piston, extends perpendicularly to the plate to a remote end. The piston slides into a bore in the injector housing, the movements of the armature and of the piston opening or closing channels in which pressurized fuel flows. The armature is provided with a device for quickly discharging the fuel which is captive between the coil and the plate.

10 Claims, 2 Drawing Sheets

(51) Int. Cl.
    *F02M 47/02*    (2006.01)
    *F02M 51/06*    (2006.01)

(52) U.S. Cl.
    CPC ..... *F02M 63/0056* (2013.01); *F16K 31/0658* (2013.01); *F02M 51/0653* (2013.01); *F02M 2200/07* (2013.01)

(58) Field of Classification Search
    CPC .......... F02M 51/0671; F02M 51/0675; F02M 51/0678; F02M 51/0682; F02M 63/0007; F02M 63/0021; F02M 63/0022; F02M 51/0653; F02M 51/0657; F02M 63/0029; F02M 2200/07; F16K 31/0658; F16K 31/0693; F16K 47/04
    USPC ............................... 251/129.16, 118, 129.07
    See application file for complete search history.

(56) References Cited

U.S. PATENT DOCUMENTS

| | | | | |
|---|---|---|---|---|
| 5,713,523 | A * | 2/1998 | Fujikawa | F02M 51/0657 239/585.1 |
| 6,027,037 | A | 2/2000 | Murakami et al. | |
| 6,651,625 | B1 * | 11/2003 | Knight | F02D 41/008 123/446 |
| 7,448,592 | B2 * | 11/2008 | Ogawa | F02M 57/02 123/90.11 |
| 2003/0062492 | A1 * | 4/2003 | Haeberer | F02M 47/027 251/64 |
| 2016/0160820 | A1 * | 6/2016 | Thibault | F02M 51/0667 239/584 |

* cited by examiner

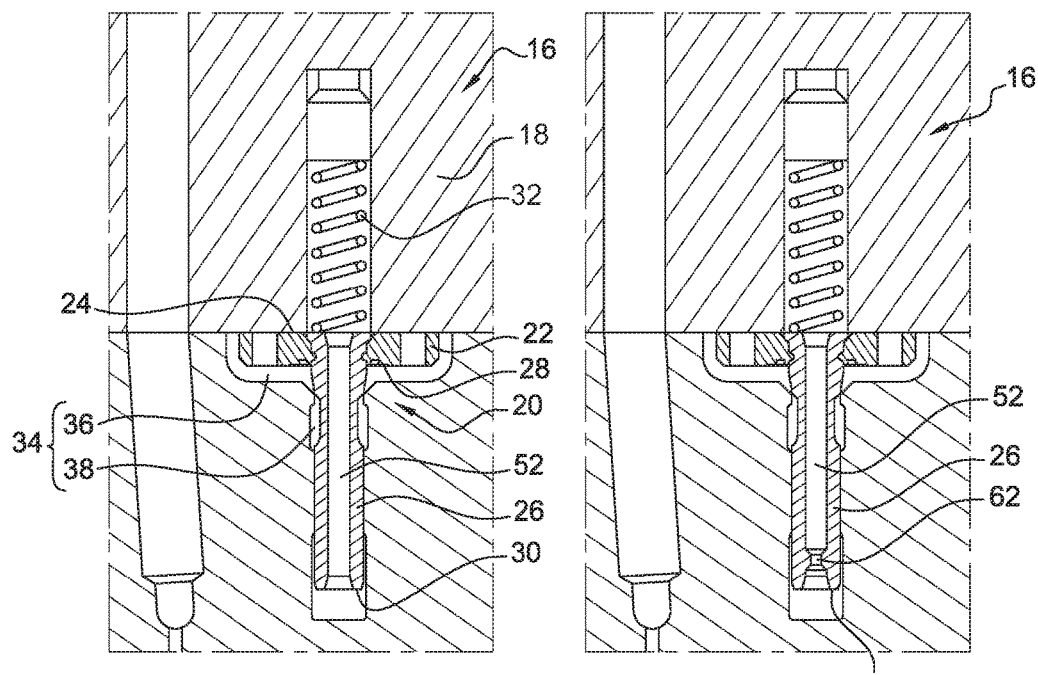
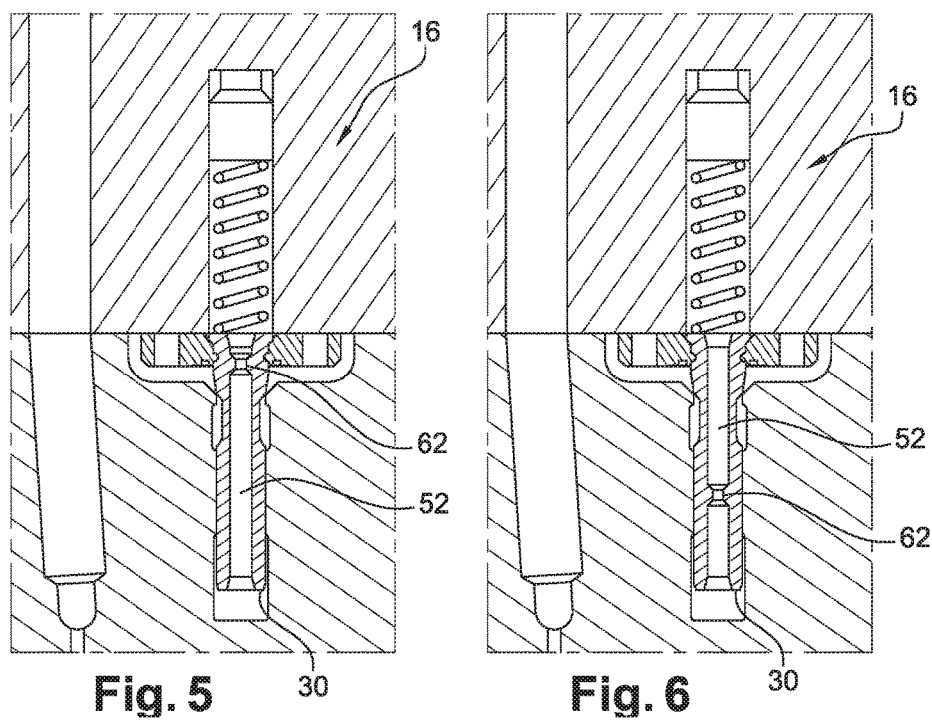

FUEL INJECTOR

CROSS REFERENCE TO RELATED APPLICATIONS

This application is a national stage application under 35 USC 371 of PCT Application No. PCT/EP2015/062571 having an international filing date of Jun. 5, 2015, which is designated in the United States and which claimed the benefit of FR Patent Application No. 1456541 filed on Jul. 7, 2014 the entire disclosures of each are hereby incorporated by reference in their entirety.

TECHNICAL FIELD

The invention relates to a fuel injector and, more particularly, to a control valve of the injector.

TECHNOLOGICAL BACKGROUND OF THE INVENTION

A fuel injector known in the art comprises a cylindrical body in which a needle is arranged sliding axially between an open position allowing the injection of fuel into a combustion chamber and a closed position preventing said injection. The movements of the needle are hydraulically controlled by a control valve comprising a fixed coil working with a magnetic armature that can be moved between an open position reached when the coil is energized, a position likewise referred to as the "up" position or position close to the coil, and a closed position or a "down" or "remote" position reached when the coil is no longer energized.

The overall shape of the armature is that of a stylized mushroom, the cap of which would be formed by a magnetic circular plate and the foot by a rod forming the valve piston. The plate is arranged proximate to the coil and the piston extends from the center of the plate, moving away from the coil.

When the coil is not energized, the armature is pushed back into the closed position by a compression spring arranged between the plate and the coil. Fuel at high pressure is then captive in a control chamber and it applies a closing force to the needle, keeping it in the closed position.

When the coil is energized, it attracts the magnetic plate towards the up position and opens a discharge channel through which the captive fuel in the control chamber can escape, the pressure in said chamber dropping to allow a needle to move into the open position.

The fuel that has escaped from the control chamber occupies the entire volume available around the armature and is found particularly in the space between the coil and the magnetic plate where it can interfere with the armature movements.

SUMMARY OF THE INVENTION

The present invention resolves these problems in part by proposing a control valve intended to control the movements of the needle in a fuel injector. The valve comprises a coil fixed to the body of the injector cooperating with an armature that can move between an open position close to the coil when said coil is energized and a closed position remote from the coil when said coil is not energized. The armature comprises a magnetic plate, from the center of which a valve rod extends perpendicularly to the plate in an opposite direction to the coil to a distal end. Said valve rod slides into a bore in the injector body, the movements of the armature and of the piston opening or closing channels in which pressurized fuel circulates. Moreover, the armature is advantageously provided with a device for quickly discharging fuel which is captive between the coil and the plate.

The discharge device comprises a discharge channel opening into the first face of the plate, arranged facing the coil, the discharge channel extending as far as an outlet through which the fuel can spread towards a low-pressure circuit.

More particularly, the discharge channel opens in the center of the first face of the plate and extends axially in the valve piston.

In one embodiment, the length of the discharge channel extends scarcely beyond the thickness of the plate and at least one auxiliary channel extends radially in the piston from said discharge channel up to the outlet situated at the periphery of the piston, proximate to the second face of the plate, opposite the first face.

In another embodiment, the discharge channel extends axially from one end to the other of the piston, from the center of the first face of the plate to the distal end of the piston.

In an alternative, the axial channel comprises a section with a smaller cross section forming a restriction, such that pressure waves spreading in the fuel are damped.

The restriction may be arranged in an intermediate position in the discharge channel, at a distance from the first face of the plate and the distal end of the piston.

In another alternative, the restriction may be arranged in the vicinity of one of the ends of the discharge channel.

The invention likewise relates to a fuel injector comprising a control valve realized according to the preceding paragraphs.

DESCRIPTION OF THE FIGURES

An embodiment of the invention is now described by means of the following figures.

FIG. 3 is a detail of the control valve according to a second embodiment of the invention.

FIGS. 4, 5 and 6 are complementary alternatives to the second embodiment in FIG. 3.

DESCRIPTION OF THE PREFERRED EMBODIMENTS

Figures 1, 2:
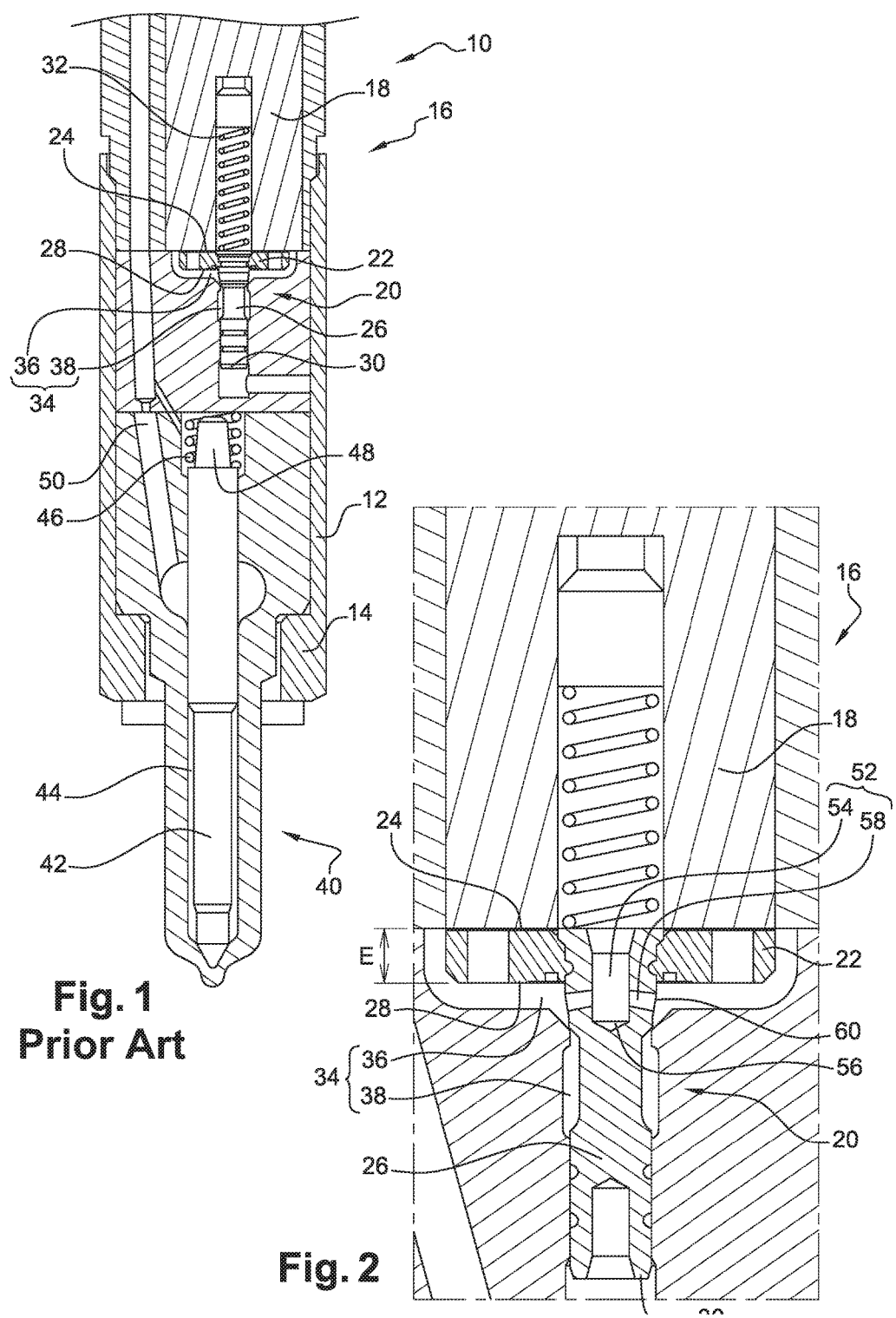
FIG. 1 is an axial section through an injector known in the prior art.
FIG. 2 is a detail of the control valve according to a first embodiment of the invention.

An injector 10, known in the prior art, is described with reference to FIG. 1. It extends along a main axis and comprises a body 12 made up of a plurality of coaxial sections held integrally against one another by an injector 14 nut. Arranged in the body 12 are a control valve 16 comprising a coil 18, fixed in the body 12, and a rod/armature assembly 20 that can be moved, itself comprising a magnetic armature 22 in the form of a plate, a first circular face 24, or upper face, whereof is facing the coil 18 and a valve rod 26 forming a valve piston 26 integral with the plate 22 which extends perpendicularly from the center of the second face 28, or the bottom face opposite the first face 24, to a distal end 30. Although numerous alternatives are possible, the chosen example exhibits a piston 26 fastened in the armature 22, the upper end of the rod 26 emerging on the first face 24 of the armature 22. Moreover, a spring 32 arranged axially in the center of the coil 18 and compressed between the base and its housing and the upper end of the rod 26 permanently attracts the rod/armature assembly 20 towards a position remote from the coil 18.

The armature 20 can be moved in a housing 34 comprising an upper cavity 36 receiving the plate and a bore 38 in which the piston 26 is adjusted in a sliding manner. The armature 20 moves between an open, or up, position and a closed, or down, position, previously identified remote from the coil.

The lower portion of the injector 10, in relation to the orientation in the figure, constitutes an injection nozzle 40 comprising a needle 42 sliding into a bore 44 between a closed position, in which the point of the needle cooperates with a nozzle seat to prevent the fuel injection, and a completely open position, in which the point is remote from the seat, allowing the fuel injection. The needle 42 is hydraulically controlled, depending on the pressure of the fuel in a control chamber 46 arranged at the top of the nozzle 40, in which the head 48 of the needle 42 emerges. Said control chamber 46 is, on the one hand, connected to a high-pressure channel 50 through which fuel arrives and, on the other hand, to the bore 38 of the valve piston through which the fuel escapes when the coil 18 is energized and the armature 20 is in the open position.

With reference to FIG. 2, a first embodiment of the invention is now described, intended to allow a quick discharge of fuel, which may be located between the coil 18 and the first face 24 of the plate 22 or else in the spring housing 32.

To do this, the armature 20 of the control valve 16 is provided with a discharge channel 52 comprising a main section 54 extending axially in the piston 26 from the center of the first face 24 of the plate to a base 56, the length of this main section 54 scarcely exceeding the thickness E of the plate 22. The discharge channel likewise comprises auxiliary channels 58 extending radially in the piston 26, from the base 56 of the main section 54 to an outlet 60 located on the perimeter of the piston 26. Two auxiliary channels 58 are represented in FIG. 2 but alternatives having only one auxiliary channel or, conversely, more than two, are entirely possible. As can be seen in FIG. 2, the outlet 60 is proximate to the second face 28 of the plate or creates fluidic communication between the inter-coil plate with the base of the cavity 36. Moreover, in order to allow a rapid discharge of the fuel, the channel 52 offers a wide opening in the first face 24 of the plate.

With reference to FIG. 3, a second embodiment of the invention will now be described. The discharge channel 52 in this case extends axially at the heart of the piston 26, opening out at the two ends, in the first face 24 of the plate and in the distal end 30 of the piston.

FIGS. 4, 5 and 6 present three alternatives to the second embodiment in FIG. 3, these alternatives allowing a pressure wave spreading through the fuel to be damped. In order to achieve this, the discharge channel 52 comprises a restriction 62 with a small cross section relative to the cross section of the discharge channel 52. This restriction 62 may be arranged proximate to the distal end 30 of the piston, as depicted in FIG. 4, or even proximate to the first face 24 of the plate, as depicted in FIG. 5, or else at any intermediate location in respect of the center of the piston, as shown in FIG. 6.

The following reference numbers are used in the description:
E thickness of the plate
10 injector
12 body of the injector
14 injector nut
16 control valve
18 coil
20 armature
22 magnetic plate
24 first face of the plate
26 valve piston
28 second face of the plate
30 distal end of the piston
32 spring
34 housing
36 cavity
38 bore of the valve piston
40 injection nozzle
42 needle
44 bore of the needle
46 control chamber
48 head of the needle
50 high-pressure channel
52 discharge channel
54 main section of the channel
56 base of the first section
58 auxiliary channels
60 outlet of the auxiliary channel
62 restriction

The invention claimed is:

1. A control valve which controls movements of a needle of a fuel injector, the control valve comprising:
a coil fixed to an injector body of the fuel injector and cooperating with an armature which moves between an open position close to the coil when the coil is energized and a closed position remote from the coil when the coil is not energized, the armature comprising a magnetic plate, which is located within a cavity, and a valve rod which extends perpendicularly from the magnetic plate in an opposite direction from the coil to a distal end, said valve rod sliding into a bore in the injector body such that a chamber is formed between the bore and the valve rod and such that movements of the armature and of the valve rod allow fluid communication between the chamber and the cavity when the armature is in the open position and prevent fluid communication between the chamber and the cavity when the armature is in the closed position, wherein the valve rod is provided with a rapid discharge device of fuel which is captive between the coil and the magnetic plate such that the rapid discharge device does not provide a path from the chamber to the cavity.

2. The control valve as claimed in claim 1, wherein the rapid discharge device comprises a discharge channel opening into a first face of the magnetic plate, arranged facing the coil, the discharge channel extending as far as an outlet through which the fuel can spread towards a low-pressure circuit.

3. The control valve as claimed in claim 2, wherein the discharge channel opens in the center of the first face of the magnetic plate and extends axially in the valve rod.

4. The control valve as claimed in claim 3, wherein the length of the discharge channel extends scarcely beyond the thickness of the magnetic plate and at least one auxiliary channel extends radially in the valve rod from said discharge channel up to the outlet situated at the periphery of the valve rod, proximate to a second face of the magnetic plate, opposite the first face.

5. The control valve as claimed in claim 2, wherein the discharge channel extends axially from one end to the other end of the valve rod, from the center of the first face of the magnetic plate to the distal end of the valve rod.

6. The control valve as claimed in claim 5, wherein the discharge channel comprises a section with a smaller cross section forming a restriction, such that pressure waves spreading in the fuel are damped.

7. The control valve as claimed in claim 6, wherein the restriction is arranged in an intermediate position in the discharge channel, at a distance from the first face of the magnetic plate and the distal end of the valve rod.

8. The control valve as claimed in claim 6, wherein the restriction is arranged in the vicinity of one of the ends of the discharge channel.

9. A fuel injector comprising the control valve as claimed in claim 1.

10. The control valve as claimed in claim 1, wherein the rapid discharge device is not in fluid communication with the chamber when the armature is in the closed position.

* * * * *